(12) United States Patent
Huang

(10) Patent No.: US 10,442,336 B2
(45) Date of Patent: Oct. 15, 2019

(54) TIE-DOWN APPARATUS

(71) Applicant: Industro International Co., Ltd., Taichung (TW)

(72) Inventor: Kuo-Chan Huang, Taichung (TW)

(73) Assignee: Industro International Co., Ltd., Taichung (TW)

( * ) Notice: Subject to any disclaimer, the term of this patent is extended or adjusted under 35 U.S.C. 154(b) by 321 days.

(21) Appl. No.: 15/600,788

(22) Filed: May 21, 2017

(65) Prior Publication Data

US 2018/0334076 A1    Nov. 22, 2018

(51) Int. Cl.
*B60P 7/08* (2006.01)
*B66D 1/06* (2006.01)
*B66D 3/02* (2006.01)

(52) U.S. Cl.
CPC ............. *B60P 7/0853* (2013.01); *B66D 1/06* (2013.01); *B66D 3/02* (2013.01)

(58) Field of Classification Search
CPC ....... B60P 7/0823; B60P 7/083; B60P 7/0838; B60P 7/0846; B60P 7/0853; B66D 1/06; B66D 3/02
See application file for complete search history.

(56) References Cited

U.S. PATENT DOCUMENTS

| | | | | |
|---|---|---|---|---|
| 6,824,121 | B2* | 11/2004 | Boice | B60P 3/075 24/69 ST |
| 7,410,334 | B2* | 8/2008 | McGrew | B60P 7/0853 410/100 |
| 7,740,232 | B2* | 6/2010 | Westberg | B60P 7/0853 16/422 |
| 8,308,410 | B2* | 11/2012 | Foryan | B60P 7/0853 410/103 |
| 2010/0051887 | A1* | 3/2010 | Wooster | B21F 9/00 254/217 |
| 2016/0318435 | A1* | 11/2016 | Martinsen | B60P 7/0846 |

* cited by examiner

*Primary Examiner* — Sang K Kim
*Assistant Examiner* — Nathaniel L Adams

(57) ABSTRACT

A tie-down apparatus includes a frame, a reel, a ratcheted wheel, a ratchet detent, a handle and a security device. The reel is rotatable relative to the frame. The ratcheted wheel is rotatable with the reel. The ratchet detent rattles on the ratcheted wheel to allow the ratcheted wheel to rotate when the ratcheted wheel is rotated in a first sense of direction. The ratchet detent is engaged with the ratcheted wheel to prevent the ratcheted wheel from rotation in an attempt to rotate the ratcheted wheel in a second sense of direction. The security device is movable between a reeling position where the security device keeps the handle connected to the reel and a locking position where the security device is supported on the frame and pressed against the ratchet detent so that the ratchet detent is firmly engaged with the ratcheted wheel, thereby keeping the reel in position.

13 Claims, 4 Drawing Sheets

TIE-DOWN APPARATUS

BACKGROUND OF INVENTION

1. Field of Invention

The present invention relates to a tie-down apparatus and, more particularly, to a tie-down apparatus with a security device.

2. Related Prior Art

A tie-down apparatus is often used to tie goods. A typical tie-down apparatus includes a frame, a reel, a ratcheted wheel, a ratchet detent, a handle and two straps. The frame includes two lateral plates and a middle plate lateral plates and a middle plate. The lateral plates extend substantially parallel to each other. The middle plate extends between the lateral plates. The reel is supported on the lateral plates so that the reel is rotatable relative to the lateral plates. A middle section of the reel is located between the lateral plates. The reel includes an end extending throughout one of the lateral plates and another end extending throughout the other lateral plate. The ratcheted wheel is connected to an end of the reel so that the ratcheted wheel is rotatable with the reel. The ratchet detent is supported on one of the lateral plates so that the former is rotatable relative to the later. The handle is connected to another end of the reel so that they are rotatable together. One of the straps includes an end connected to the middle plate and another end connected to a hook. The other strap includes an end connected to the reel and another end connected to another hook. In use of the tie-down apparatus, the hooks are used to hook two proper portions of a truck for example after the straps are located against goods. Then, the handle is operated to rotate the reel rotated in a sense of direction. The reel reels in one of the straps. Thus, the straps are pressed tight on the goods. The ratcheted wheel rotates with the reel while the ratchet detent rattles on the ratcheted wheel. Whenever the handle is stopped, the reel and the ratcheted wheel are stopped, and the ratcheted wheel is engaged with the ratchet detent. That is, the ratchet detent keeps the ratcheted wheel and the reel in position. Hence, the tension in the straps is retained, and the goods are tied on the truck. The use of the tie-down apparatus is not without any problem. Firstly, the handle is not collapsible, and could easily be entangled with and mistakenly operated by an eternal object, thereby jeopardizing the reliability of the tie-down apparatus. Secondly, the ratchet detent could be touched and disengaged from the ratcheted wheel so that the ratcheted wheel and the reel could be rotated in an opposite sense of direction to release straps.

The present invention is therefore intended to obviate or at least alleviate the problems encountered in prior art.

SUMMARY OF INVENTION

It is an objective of the present invention to provide a compact and reliable tie-down apparatus.

To achieve the foregoing objective, the tie-down apparatus includes a frame, a reel, a ratcheted wheel, a ratchet detent, a handle and a security device. The reel is supported on the frame so that the reel is rotatable relative to the frame. The ratcheted wheel is connected to the reel so that the ratcheted wheel is rotatable with the reel. The ratchet detent is supported on the frame so that the ratchet detent rattles on the ratcheted wheel to allow the ratcheted wheel to rotate when the ratcheted wheel is rotated in a first sense of direction. The ratchet detent is engaged with the ratcheted wheel to prevent the ratcheted wheel from rotation in an attempt to rotate the ratcheted wheel in a second sense of direction. The security device is movable between a reeling position and a locking position. In the reeling position, the security device keeps the handle connected to the reel. In the locking position, the security device is supported on the frame and hence pressed against the ratchet detent so that the ratchet detent is firmly engaged with the ratcheted wheel, thereby keeping the reel in position.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
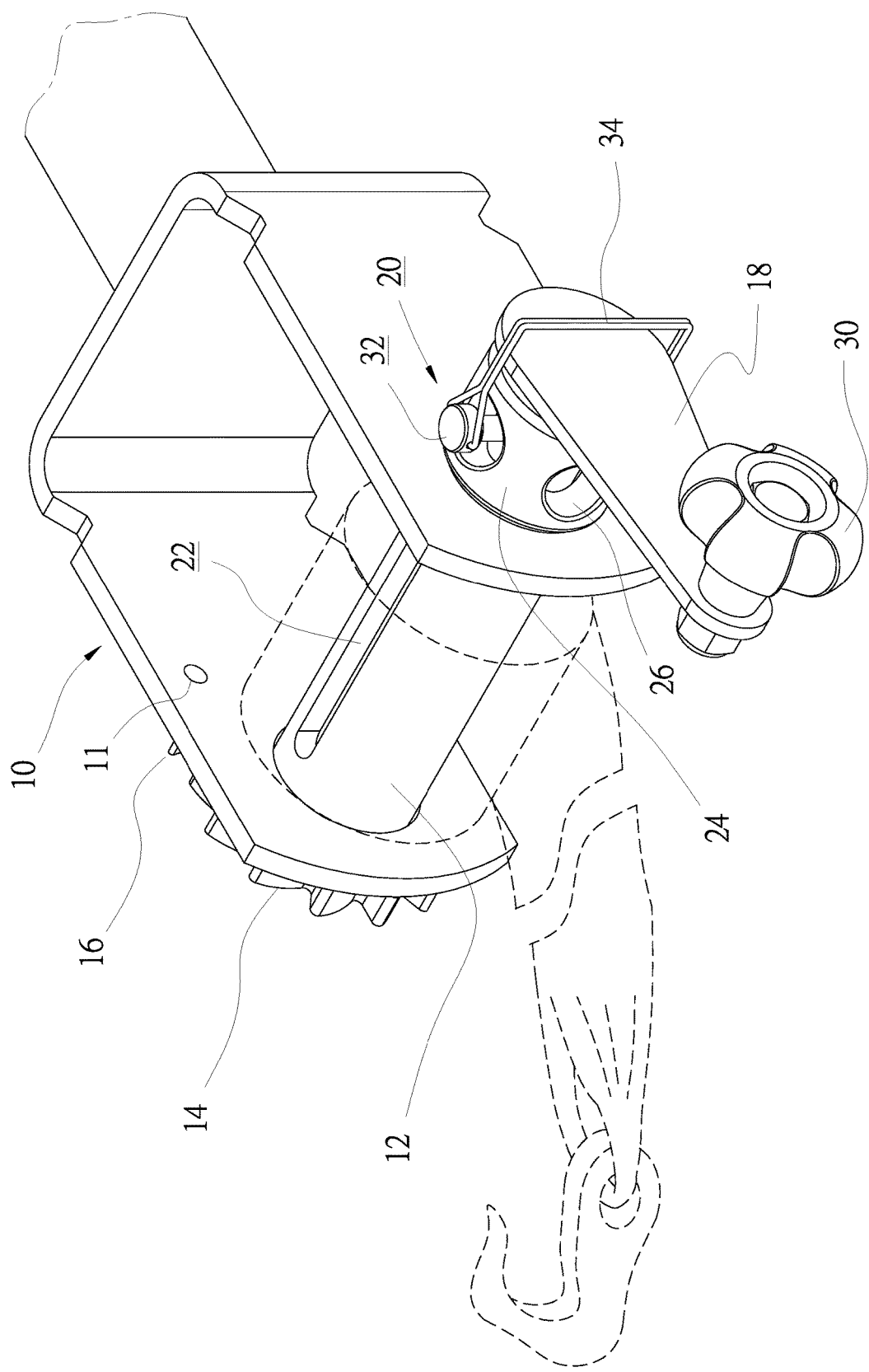
FIG. 1 is a perspective view of a tie-down apparatus according to the preferred embodiment of the present invention.
Figure 2:
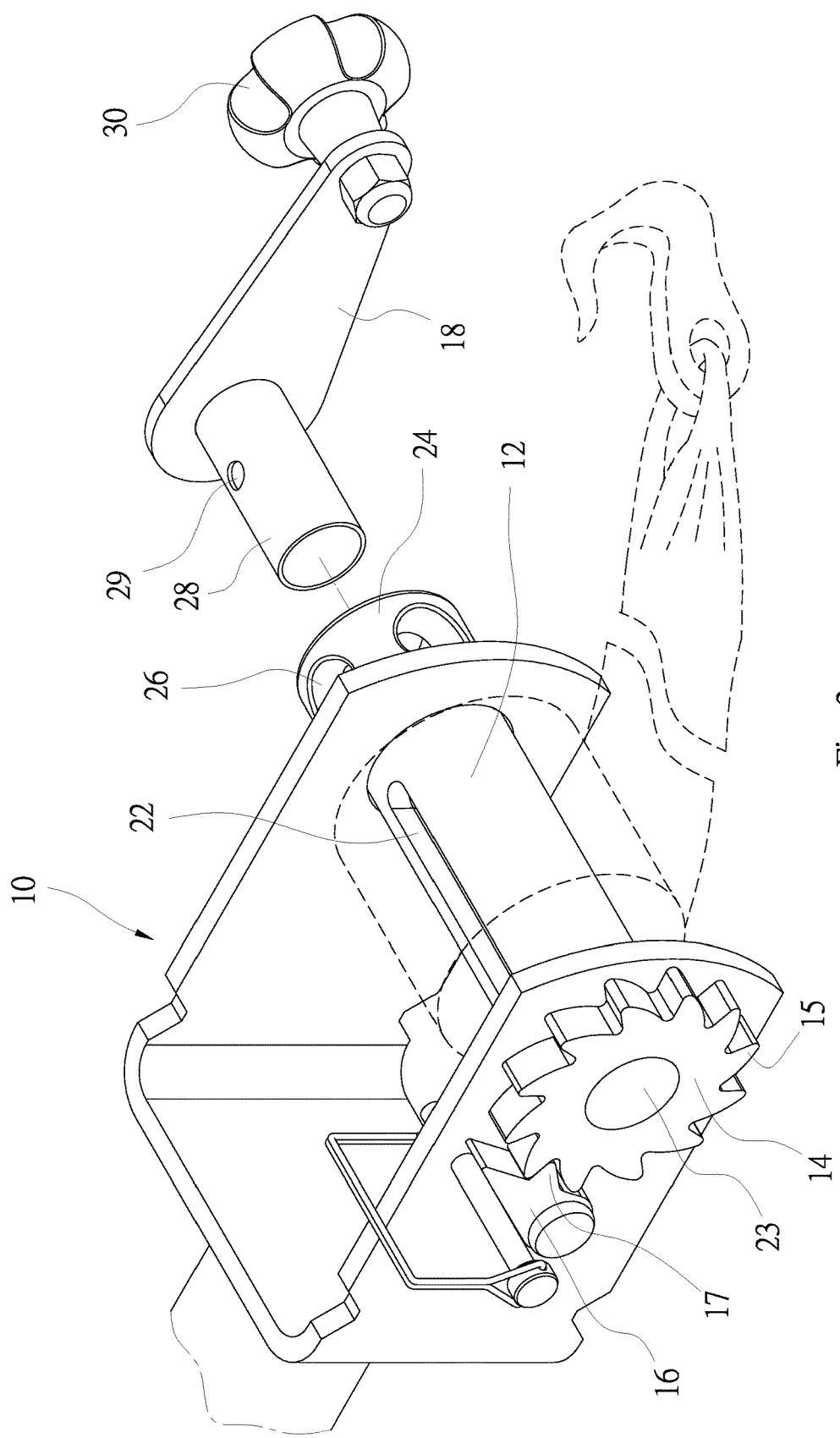
FIG. 2 is an exploded view of the tie-down apparatus taken in another sense of direction than shown in FIG. 1.

Referring to FIGS. 1 and 2, a tie-down apparatus includes a frame 10, a reel 12, a ratcheted wheel 14, a ratchet detent 16, a handle 18, a security device 20 and two straps (not numbered) according to the preferred embodiment of the present invention. The frame 10 includes two lateral plates (not numbered) and a middle plate (not numbered). The lateral plates extend substantially parallel to each other. The middle plate extends between the lateral plates. Each of the lateral plates includes a circular opening (not numbered). The circular bores are coaxial. One of the lateral plates further includes an aperture 11.

The reel 12 is supported on the lateral plates of the frame 10 so that the reel 12 is rotatable relative to the lateral plates of the frame 10. A middle section of the reel 12 is located between the lateral plates of the frame 10. An end (the "first end") of the reel 12 extends throughout the circular opening of one of the lateral plates of the frame 10. Another end (the "second end") of the reel 12 extends throughout the circular opening of the other lateral plate of the frame 10. The reel 12 includes a slot 22 in the middle section. The slot 22 includes two closed ends along a length of the reel 12. The slot 22 includes two open ends along a diameter of the reel 12, i.e., the slot 22 extends throughout the reel 12 along the diameter of the reel 12. The reel 12 includes a reduced portion 23 at the first end and an enlarged portion 24 at the second end. The enlarged portion 24 includes several bores 26. Each of the bores 26 extends throughout the enlarged portion 24 along a diameter of the enlarged portion 24.

The ratcheted wheel 14 is located on and around the reduced portion 23 of the reel 12, and the ratcheted wheel 14 is connected to the reel 12 in a proper manner so that they are rotatable together. The ratcheted wheel 14 includes several ratchets 15 formed on the periphery.

The ratchet detent 16 is supported on one of the lateral plates of the frame 10, thereby rendering the ratchet detent 16 rotatable relative to the lateral plates. The ratchet detent 16 is located in the vicinity of the ratcheted wheel 14. The ratchet detent 16 includes an obtuse end, a sharp end and a tooth 17. The tooth 17 extends from a side (the "first side") of the ratchet detent 16 between the obtuse end and sharp end. The ratchet detent 16 is pivotally connected to the lateral plate of the frame 10 near the obtuse end. The tooth 17 of the ratchet detent 16 can be engaged with any one of the ratchets 15 of the ratcheted wheel 14. The tooth 17 of the ratchet detent 16 rattles on the ratchets 15 of the ratcheted wheel 14, and the ratchet detent 16 pivots to and fro when the ratcheted wheel 14 is rotated in a first sense of direction. In an attempt to rotate the ratcheted wheel 14 in a second sense of direction, the tooth 17 of the ratchet detent 16 is engaged with one of the ratchets 15 of the ratcheted wheel 14 so that the ratchet detent 16 hence prevents the ratcheted wheel 14 from rotation in the second sense of direction.

The handle 18 includes a shaft 28 and a knob 30. The shaft 28 transversely extends from a side of the handle 18 near an end. In the preferred embodiment, the shaft 28 is a tubular element made with two bores 29. However, in another embodiment, the shaft 28 can be a solid element made with a bore 29. The knob 30 is connected to another side of the handle 18, near another end. The knob 30 is rotatable relative to the handle 18. The knob 30 is rotatable about an axis perpendicular to a length of the handle 18. The knob 30 is arranged to render it easy to operate the handle 18. The shaft 28 of the handle 18 can be inserted in the enlarged portion 24 of the reel 12.

Figure 3:
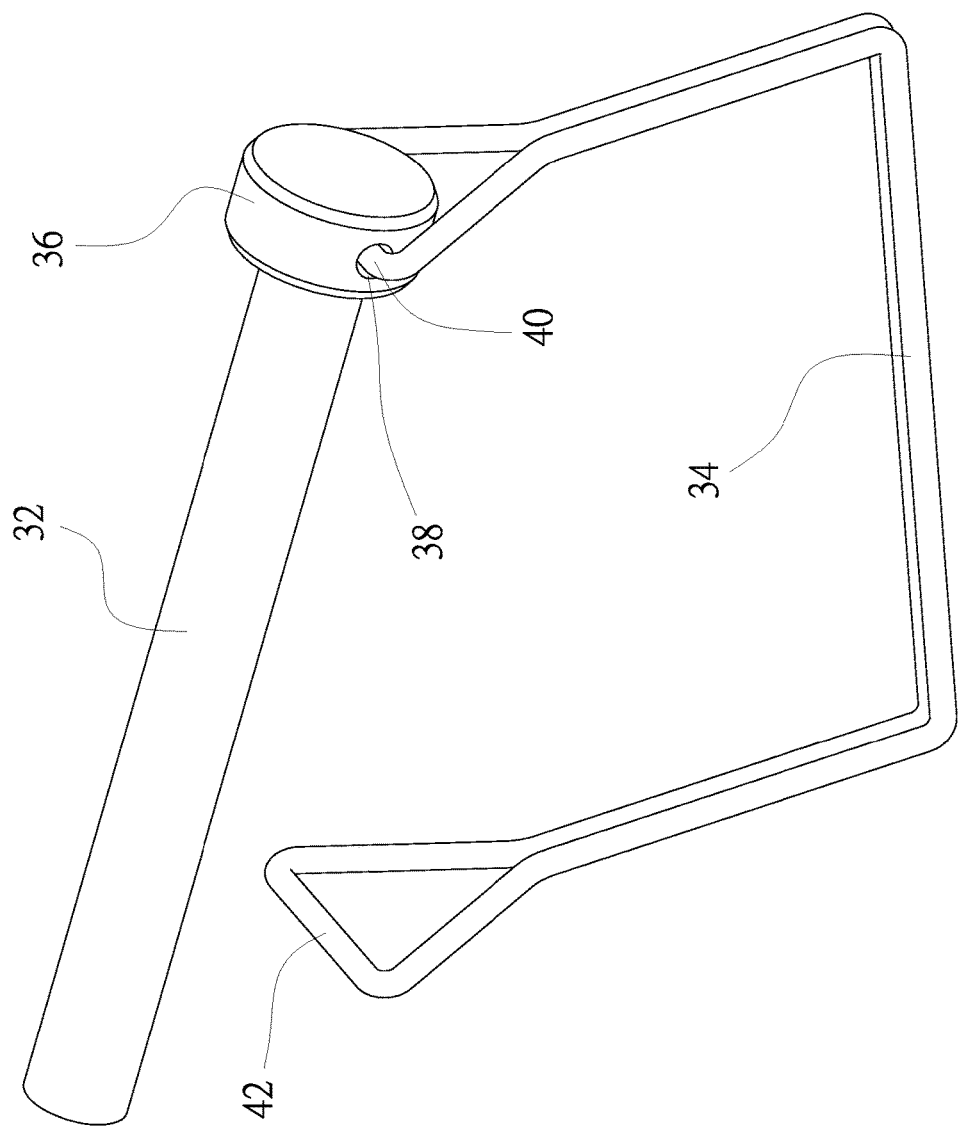
FIG. 3 is a perspective view of a security device the tie-down apparatus taken in another sense of direction than shown in FIG. 1.
Figure 4:
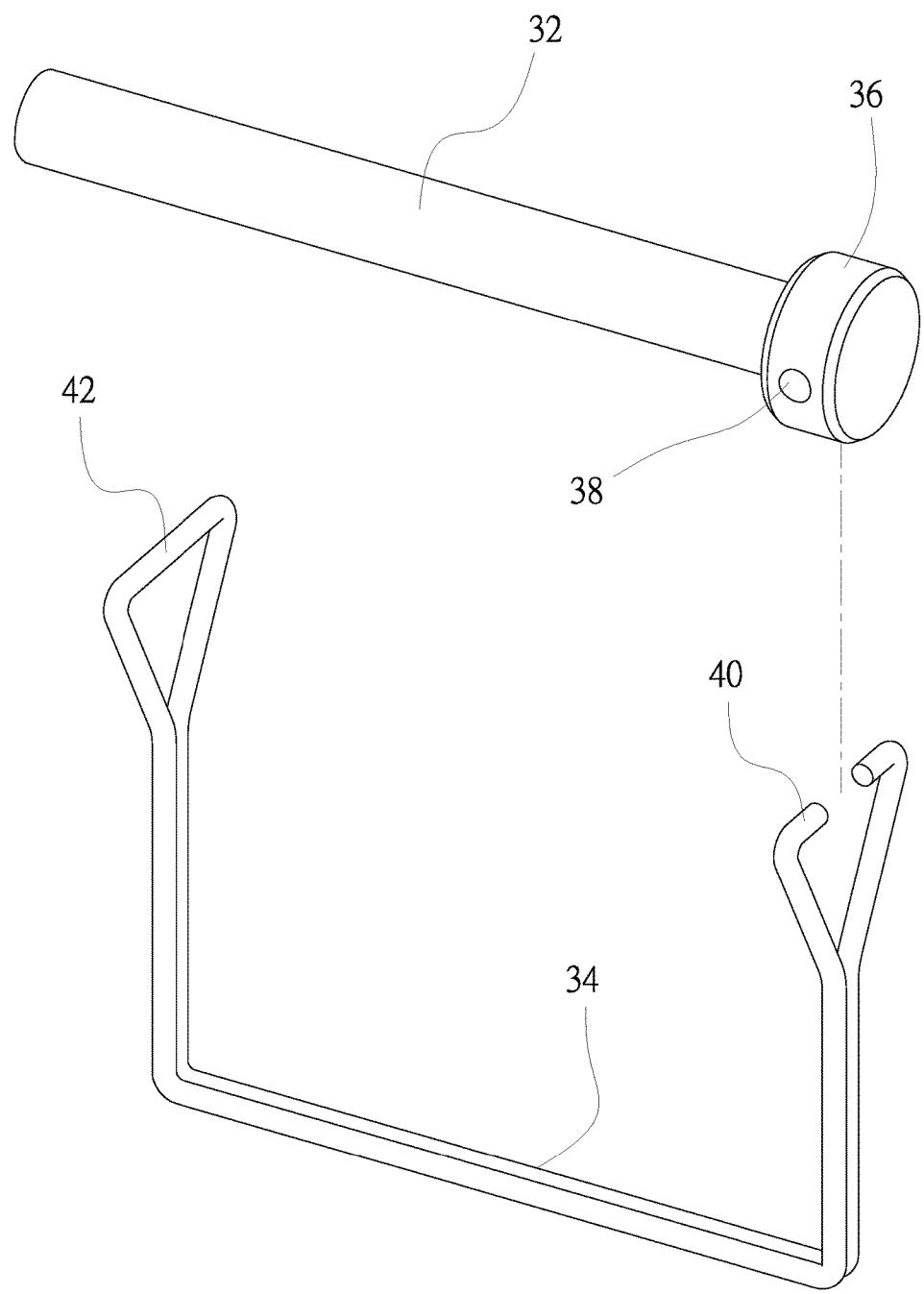
FIG. 4 is an exploded view of the security device taken in another sense of direction than shown in FIG. 3.

Referring to FIGS. 3 and 4, the security device 20 includes a pin 32 and a clip 34. The pin 32 includes an enlarged portion 36 at an end (the "first end"). The enlarged portion 36 includes a circular bore 38 that extends throughout the enlarged portion 36 along a diameter. The clip 34 is made of an elastic metal strip. Firstly, the metal strip is folded so that two ends thereof are located at an end of the clip 34 while a middle section of the metal strip is located at another end of the clip 34. Secondly, the folded metal wire is bent so that it becomes a U-shaped element that includes a middle section and two lateral sections. The lateral sections of the clip 34 extend parallel to each other. The middle section of the clip 34 extends substantially perpendicular to the lateral sections. Then, the ends of the metal strip are bent outwards and then inwards so that each of the ends of the metal strip becomes an insert 40. The ends of the metal strip together form a triangular configuration. The inserts 40 are inserted in the circular bores 38, thereby rendering the clip 34 rotatable relative to the pin 32. Finally, the middle section of the metal strip is turned into a loop 42. The loop 42 is triangular.

The first strap includes an end connected to the middle plate of the frame 10 and another end connected to a hook (not shown). The second strap includes an end extending throughout the slot 22 of the reel 12 and another end connected to another hook (not shown).

The tie-down apparatus is movable at least one reeling position and a locking position. Referring to FIG. 1, in the reeling position, the shaft 28 of the handle 18 is inserted in the enlarged portion 24 of the reel 12. The bores 29 of the shaft 28 are aligned with two of the bores 26 of the enlarged portion 24 before the pin 32 is inserted in the aligned bores 29 and 26. The enlarged portion 36 of the pin 32 and another end (the second end) of the pin 32 are located out of the enlarged portion 24 of the reel 12. The loop 42 is engaged with the second end of the pin 32. Thus, the clip 34 keeps the pin 32 in the shaft 28 and the enlarged portion 24 of the reel 12. That is, the security device 20 retains the connection of the handle 18 to the reel 12. Then, the hooks are used to hook two portions of a truck for example. The straps are located around goods. The handle 18 is pivoted in a first sense of direction to rotate the reel 12. The reel 12 reels in one of the straps. Thus, the straps tightly tie the goods to the truck. The ratcheted wheel 14 is rotated with the reel 12, and the tooth 17 of the ratchet detent 16 rattles on the ratchets 15 of the ratcheted wheel 14. Whenever the handle 18 is stopped, the reel 12 and the ratcheted wheel 14 are stopped, and the tooth 17 of the ratchet detent 16 is engaged with one of the ratchets 15 of the ratcheted wheel 14. That is, the ratchet detent 16 keeps the ratcheted wheel 14 and the reel 12 in position. Hence, the tension in the straps is kept, and the goods are kept in position on the truck.

To move the tie-down apparatus to the locking position from the reeling position, the loop 42 is removed from the second end of the pin 32. Then, the pin 32 is removed from the aligned bores 29 and 26. The shaft 28 is removed from the enlarged portion 24.

Referring to FIG. 2, in the locking position, the pin 32 is inserted in the aperture 11 so that the enlarged portion 36 at the first end of the pin 32 is located out of the frame 10 while the second end of the pin 32 is inserted in the frame 10. The loop 42 is engaged with the second end of the pin 32. Thus, the clip 34 keeps the pin 32 in one of the lateral plates of the frame 10. The pin 32 abuts against another side (the "second side") of the ratchet detent 16 so that the ratchet detent 16 cannot be pivoted from the ratcheted wheel 14. That is, the tooth 17 on the first side of the pin 32 cannot be disengaged from the ratchets 15 of the ratcheted wheel 14. Hence, the reel 12 cannot be rotated in the second sense of direction. The tension in the straps cannot be reduced. The goods cannot be released from the truck.

Notably, the location of the aperture 11 is matched with the length of the lateral sections of the clip 34. Thus, the middle section of the clip 34 is pressed against the corresponding lateral plate of the frame 10 so that the clip 34 cannot be pivoted relative to the corresponding lateral plate of the frame 10.

As discussed above, the handle 18 can be detached from the reel 12 so that the handle 18 would not be tangled with an external object and mistakenly operated to jeopardize the reliability of the tie-down apparatus. Moreover, the security device 20 keeps the ratchet detent 16 engaged with the ratcheted wheel 14, thereby keeping the reel 12 in position. Hence, the tension in the straps is retained, and the goods are tightly tied to the truck.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A tie-down apparatus comprising:
   a frame;
   a reel supported on the frame so that the reel is rotatable relative to the frame;
   a ratcheted wheel connected to the reel so that the ratcheted wheel is rotatable with the reel;
   a ratchet detent supported on the frame so that the ratchet detent rattles on the ratcheted wheel to allow the ratcheted wheel to rotate when the ratcheted wheel is rotated in a first sense of direction, and that the ratchet detent is engaged with the ratcheted wheel to prevent the ratcheted wheel from rotation in an attempt to rotate the ratcheted wheel in a second sense of direction;

a handle; and a security device movable between a reeling position where the security device keeps the handle connected to the reel and a locking position where the security device is supported on the frame and hence pressed against the ratchet detent so that the ratchet detent is thinly engaged with the ratcheted wheel, thereby keeping the reel in position.

2. The tie-down apparatus according to claim 1, wherein the security device comprises a pin inserted in the reel and the handle so that the reel is rotatable with the handle in the reeling position, and the pin is inserted in the frame and hence pressed against the ratchet detent in the locking position.

3. The tie-down apparatus according to claim 2, wherein the reel comprises several bores, the handle comprises a shaft formed with at least one bore, and the pin is inserted in at least one of the bores of the reel and the bore of the shaft in the reeling position.

4. The tie-down apparatus according to claim 2, wherein the security device further comprises a clip formed with a first end pivotally connected to a first end of the pin and a second end operable for engagement with a second end of the pin so that the pin is kept in the reel and the shaft in the reeling position, and that the pin is kept in the frame in the locking position.

5. The tie-down apparatus according to claim 4, wherein the pin comprises a bore at one of the ends thereof, and the clip comprises, at one of the ends thereof, two inserts operable for insertion in the bore of the pin.

6. The tie-down apparatus according to claim 5, wherein the clip comprises, at the other end thereof, a loop operable for engagement with the other end of the pin.

7. The tie-down apparatus according to claim 6, wherein the clip comprises two lateral sections extending substantially parallel to each other and a middle section transversely formed between the lateral sections, the inserts is located on one of the lateral sections of the clip while the loop is located on the other lateral section of the clip.

8. The tie-down apparatus according to claim 7, wherein the frame comprises an aperture, the lateral sections of the clip are made with a certain length so that the middle section of the clip is pressed against an edge of the frame to prevent the clip from pivoting when the pin is inserted in the aperture of the frame.

9. The tie-down apparatus according to claim 2, wherein the handle further comprises a knob connected to a side of the handle near an end, and the shaft extends from another side of the handle near another end.

10. The tie-down apparatus according to claim 9, wherein the knob is rotatable relative to the handle.

11. The tie-down apparatus according to claim 10, wherein the knob is rotatable around an axis perpendicular to a length of the handle.

12. The tie-down apparatus according to claim 1, wherein the ratchet detent comprises an obtuse end, a sharp end, a first side adapted for engagement with the ratcheted wheel, and a second side for abutment against the security device.

13. The tie-down apparatus according to claim 12, wherein the ratchet detent comprises a tooth formed with a side, and the ratcheted wheel comprises ratchets adapted for engagement with the tooth of the ratchet detent.

\* \* \* \* \*